(12) United States Patent
Latta

(10) Patent No.: US 9,485,980 B1
(45) Date of Patent: Nov. 8, 2016

(54) FISH HOOK REMOVAL APPARATUS AND METHODS OF USE

(71) Applicant: Charles H. Latta, Blountsville, AL (US)

(72) Inventor: Charles H. Latta, Blountsville, AL (US)

( * ) Notice: Subject to any disclaimer, the term of this patent is extended or adjusted under 35 U.S.C. 154(b) by 0 days.

(21) Appl. No.: 15/082,643

(22) Filed: Mar. 28, 2016

(51) Int. Cl.
*A01K 97/18* (2006.01)

(52) U.S. Cl.
CPC ..................................... *A01K 97/18* (2013.01)

(58) Field of Classification Search
CPC ............................... A01K 97/00; A01K 97/18
USPC .............. 43/4, 53.5, 6; 7/106; D22/118, 149
IPC ...................................................... A01K 97/18
See application file for complete search history.

(56) References Cited

U.S. PATENT DOCUMENTS

| | | | |
|---|---|---|---|
| 2,294,758 A | 9/1942 | Manske | |
| 2,806,319 A | 9/1957 | Kurzak | |
| 2,836,004 A | 5/1958 | Stader | |
| 2,892,284 A | 6/1959 | Shawhan | |
| 2,992,507 A | 7/1961 | Gray | |
| 3,132,438 A | 5/1964 | Ward | |
| 3,419,924 A * | 1/1969 | Archibald | A01K 91/04 43/53.5 |
| 3,588,078 A * | 6/1971 | Sande | A01K 91/04 269/6 |
| 3,721,034 A | 3/1973 | Collins | |
| 3,949,731 A * | 4/1976 | Caso | F41B 7/04 124/26 |
| 4,014,125 A * | 3/1977 | Baldi | A01K 81/00 124/22 |
| 4,342,171 A | 8/1982 | Cripps et al. | |
| 4,590,702 A | 5/1986 | Chestnutt | |
| 5,307,586 A | 5/1994 | Palmer | |
| 5,628,538 A * | 5/1997 | Ericksen | A01K 97/24 294/210 |
| 5,983,555 A | 11/1999 | Biel | |
| 6,038,808 A | 3/2000 | Bergeron et al. | |
| 7,393,344 B2 * | 7/2008 | Mohammed | A61M 5/3232 604/195 |
| 7,934,336 B2 * | 5/2011 | Cooksey | A01K 97/00 43/4 |
| 2009/0149836 A1 * | 6/2009 | Teachout | A61D 1/14 604/540 |
| 2011/0103875 A1 * | 5/2011 | Huang | B43K 8/00 401/104 |

OTHER PUBLICATIONS

Translation of JP H07227188.*

* cited by examiner

*Primary Examiner* — Thien Thanh Pham
(74) *Attorney, Agent, or Firm* — Bush Intellectual Property Law; Kenneth M. Bush

(57) ABSTRACT

An apparatus for removing a fish hook from the mouth of a fish and related methods of use. The apparatus comprises a rod slidably mounted within a housing for movement between an extended position and a retracted position. A spring biases the rod toward the extended position. In use, the rod is pushed into the housing and is locked in the retracted position. The fishing line attached to the fish hook is folded over to form a loop and the loop is threaded through an arcuate channel in a proximal tip of the rod. The apparatus is slid along the fishing line until the proximal tip engages the fish hook. A trigger handle on the apparatus is actuated to release the rod from the housing. The spring forcibly moves the rod into the extended position to remove the fish hook from the mouth of the fish.

8 Claims, 2 Drawing Sheets

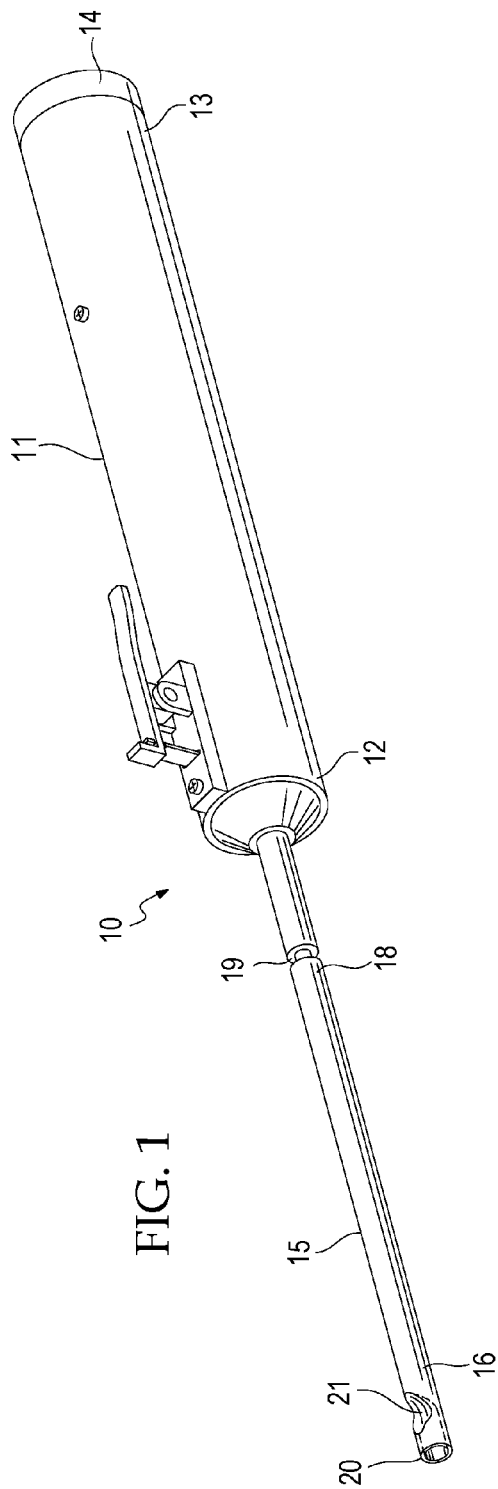
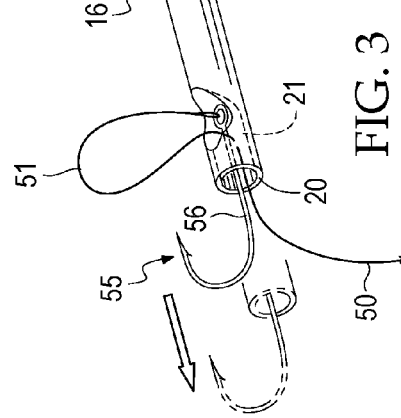
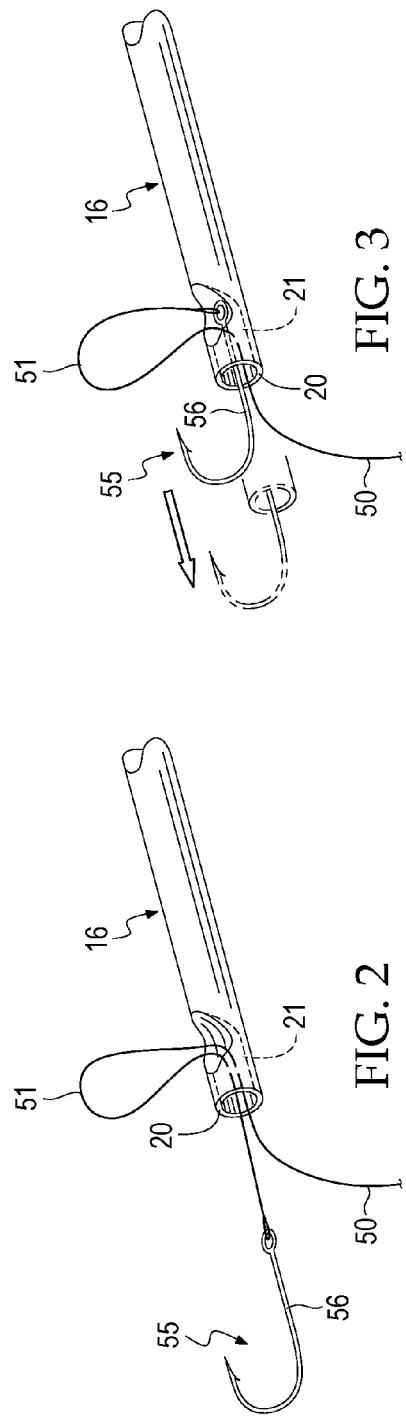
FIG. 1
FIG. 2
FIG. 3

FISH HOOK REMOVAL APPARATUS AND METHODS OF USE

FIELD OF THE INVENTION

The present invention relates to tools used in fishing, and more particularly, to an automated fish hook removal device and related methods of use.

BACKGROUND OF THE INVENTION

While sport fishing, a fish hook is typically used to catch a fish. During this process, the fish hook is typically embedded in the mouth or throat of the fish. Once the fish has been retrieved, the fish hook must be detached and removed from the fish to either release the fish or store the fish for later use. Removing a fish hook can be cumbersome, and many hook removal devices have been developed over the years to assist an angler in removing a fish hook. The present invention is an improvement to these prior art devices.

SUMMARY OF THE INVENTION

The present invention is an apparatus for removing a fish hook from the mouth of a fish, comprising a hollow tubular housing and a rod slidably mounted within the housing for linear movement between an extended position and a retracted position. The rod comprises a proximal end outside of the housing and an opposing distal end secured within the housing. The rod further comprises a middle section slidable between the extended position wherein the middle section is outside of the housing and the retracted position wherein the middle section is within the housing. The middle section preferably has an annular slot formed in the surface thereof. The rod further comprises a proximal tip having an arcuate channel for receiving fishing line therethrough and a fish hook shank therein.

The apparatus further comprises a first rod guide immovably mounted within the housing at the open first end thereof and a second rod guide immovably mounted within the housing between the first rod guide and the closed second end of the housing. Both the first and the second rod guides have a channel therethrough for receiving the rod slidably therein. A compression spring is mounted within the housing preferably between the first rod guide and the second rod guide, wherein the compression spring circumscribes the rod and comprises a first end secured to the rod for concomitant movement therewith and a second end immovably secured to the housing. The compression spring biases the rod toward the extended position and the rod is operable to compress the compression spring when the rod is pushed into the housing and into the retracted position.

A trigger pin is slidably mounted through a slot formed through a sidewall of the housing. The trigger pin has a first end within the housing and an opposing second end outside of the housing. The annular slot on the rod is operable to slide into alignment with the first end of the trigger pin when the rod is pushed into the housing and into the retracted position. The first end of the trigger pin is operable to slide into the annular slot when the annular slot slides into alignment with the first end of the trigger pin and thereby reversibly secure the rod within the housing. A trigger handle is pivotably mounted outside of the housing. The trigger handle has a first end connected to the second end of the trigger pin and an opposing second end. A torsion spring is mounted under the trigger handle to bias the first end of the trigger handle toward the housing such that the first end of the trigger pin is urged into slidable engagement with the middle section of the rod.

The trigger handle is operable to pivot the first end of the trigger handle away from the housing when the second end of the trigger handle is depressed toward the housing. The first end of the trigger handle is operable to lift the trigger pin away from the rod and thereby disengage the first end of the trigger pin from the annular slot when the first end of the trigger handle is pivoted away from the housing. The compression spring is operable to forcibly extend the proximal end of the rod away from the housing and into the extended position when the first end of the trigger pin is disengaged from the annular slot. The proximal tip of the rod is operable to forcibly engage a fish hook embedded within the mouth of a fish when the proximal end of the rod forcibly extends away from the housing and thereby remove the fish hook from the mouth of the fish.

In use, the rod is pushed into the housing and into the retracted position, whereby the trigger pin will engage the annular slot to secure the rod in the retracted position. A portion of the fishing line attached to the fish hook is folded over to form a loop and the loop is threaded through the arcuate channel in the proximal tip of the rod. The apparatus is slid along the fishing line until the proximal tip engages the fish hook. The second end of the trigger handle is depressed to disengage the trigger pin from the rod and thereby release the rod to forcibly move into the extended position and forcibly remove the fish hook from the mouth of the fish.

These and other features of the invention will become apparent from the following detailed description of the invention.

BRIEF DESCRIPTION OF THE DRAWINGS

FIG. 1 is a perspective view of a preferred embodiment of the present invention.

FIG. 2 is a perspective view of the proximal end of the rod showing a fishing line threaded through the arcuate channel.

FIG. 3 is a perspective view of the proximal end of the rod showing a fish hook secured in the arcuate channel.

Figure 4:
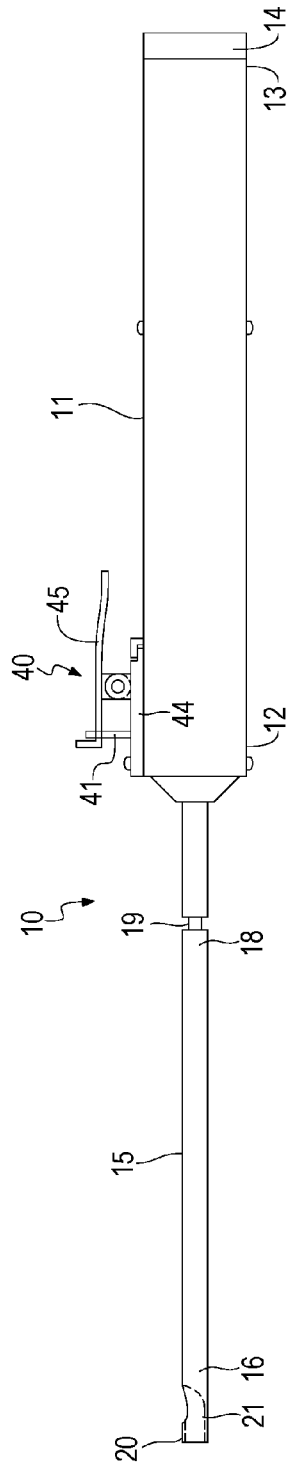
FIG. 4 is a side elevation view of the preferred embodiment of the present invention.
Figure 5:
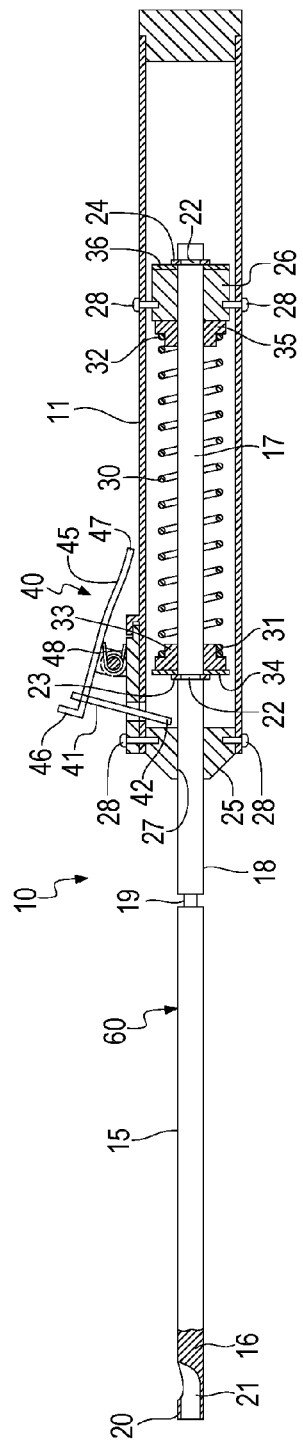
FIG. 5 is a side sectional view of the embodiment shown in FIG. 4 with the rod in the extended position.

When the terms "top," "bottom," "right," "left," "front," "rear," "first," "second," "inside," "outside," "proximal," "distal," and similar terms are used, the terms should be understood in reference to the orientation of the implementations shown in the drawings and are utilized to facilitate description thereof.

DETAILED DESCRIPTION OF THE INVENTION

Figure 6:
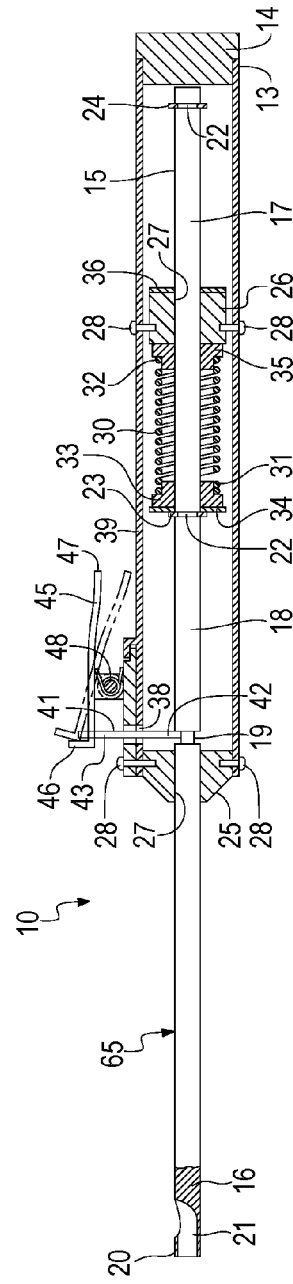
FIG. 6 is a side sectional view of the embodiment shown in FIG. 4 with the rod in the retracted position.

The preferred embodiment of the present invention is shown in FIGS. 1-6, wherein the apparatus 10 comprises a hollow housing 11, preferably tubular in shape, and a rod 15 slidably mounted within the housing 11 for linear movement between an extended position 60 (see FIG. 5) and a retracted position 65 (see FIG. 6). The housing 11 has an open first end 12 and an opposing second end 13 which is preferably closed by an end cap 14. The rod 15 comprises a proximal end 16 outside of the housing 11 and an opposing distal end 17 secured within the housing 11. The rod 15 further comprises a middle section 18 slidable between the extended position 60 wherein the middle section 18 is outside of the housing 11 and the retracted position 65 wherein the middle section 18 is within the housing 11. The middle section 18 preferably has an annular slot 19 formed in the surface thereof. The rod 15 further comprises a proximal tip 20 having an arcuate channel 21 for receiving fishing line 50 therethrough and a fish hook 55 therein. The proximal tip 20 is preferably magnetic for reversibly securing a metal fish hook therein. The rod 15 preferably further comprises a pair of grooves 22 along the length thereof for receiving a pair of retainer clips 23, 24 therein, such as e-clips. The distal clip 24 functions as a stop to keep the distal end 17 of the rod 15 within the housing 11.

The apparatus 10 further comprises a first rod guide 25 immovably mounted within the housing 11 preferably at the open first end 12 thereof and a second rod guide 26 immovably mounted within the housing 11 between the first rod guide 25 and the second end 13 of the housing 11. Each rod guide 25, 26 has a channel 27 therethrough for receiving the rod 15 slidably therein. The rod guides 25, 26 are preferably secured to the housing with a plurality of fasteners 28.

A compression spring 30 is mounted within the housing 11 preferably between the first rod guide 25 and the second rod guide 26, wherein the compression spring 30 circumscribes the rod 15 and comprises a first end 31 secured to the rod 15 for concomitant movement therewith and a second end 32 immovably secured to the housing 11. The first end 31 of the compression spring 30 is preferably secured to a first spring retainer 33 circumscribing the rod 15. The first spring retainer 33 preferably abuts a first washer 34 which, in turn, preferably abuts the proximal retainer clip 23. The second end 32 of the compression spring 30 is preferably secured to a second spring retainer 35 circumscribing the rod 15. The second spring retainer 35 preferably abuts the second rod guide 26. The distal retainer clip 24 preferably reversibly abuts a second washer 36 which, in turn, abuts the second rod guide 26. As noted above, the distal clip 24 functions as a stop to keep the distal end 17 of the rod 15 within the housing 11. Thus, engagement of the distal clip 24 with the immovable second rod guide 26 (via washer 36, if present) maintains the distal end 17 of the rod 15 within the housing 11. The compression spring 30 biases the rod 15 toward the extended position 60 and the rod 15 is operable to compress the compression spring 30 when the rod 15 is pushed into the housing 11 and into the retracted position 65.

A trigger assembly 40 comprises a trigger pin 41 slidably mounted through a slot or opening 38 formed through a sidewall 39 of the housing 11. The trigger pin 41 has a first end 42 within the housing 11 and an opposing second end 43 outside of the housing 11. The annular slot 19 is operable to slide into alignment with the first end 42 of the trigger pin 41 when the rod 15 is pushed into the housing 11 and into the retracted position 65. The first end 42 of the trigger pin 41 is operable to slide into the annular slot 19 when the annular slot 19 slides into alignment with the first end 42 of the trigger pin 41 and thereby reversibly secure the rod 15 within the housing 11. The trigger assembly 40 further comprises a trigger handle 45 pivotably mounted outside of the housing 11, preferably to a base mount 44 which, in turn, is mounted to the sidewall 39 of the housing 11. The trigger handle 45 has a first end 46 connected to the second end 43 of the trigger pin 41 and an opposing second end 47. Preferably, a torsion spring 48 is mounted under the trigger handle 45 to bias the first end 46 of the trigger handle 45 toward the housing 11 such that the first end 42 of the trigger pin 41 is urged into slidable engagement with the middle section 18 of the rod 15.

The trigger handle 45 is operable to pivot the first end 46 of the trigger handle 45 away from the housing 11 when the second end 47 of the trigger handle 47 is depressed toward the housing 11. The first end 46 of the trigger handle 45 is operable to lift the trigger pin 41 away from the rod 15 and thereby disengage the first end 42 of the trigger pin 41 from the annular slot 19 when the first end 46 of the trigger handle 45 is pivoted away from the housing 11. The compression spring 30 is operable to forcibly extend the proximal end 16 of the rod 15 away from the housing 11 and into the extended position 60 when the first end 42 of the trigger pin 41 is disengaged from the annular slot 19. The proximal tip 20 of the rod 15 is operable to forcibly engage a fish hook 55 embedded within the mouth of a fish when the proximal end 16 of the rod 15 forcibly extends away from the housing 11 and thereby remove the fish hook 55 from the mouth of the fish.

In use, the rod 15 is pushed into the housing 11 and into the retracted position 65 (see FIG. 6), whereby the trigger pin 41 will engage the annular slot 19 to secure the rod 15 in the retracted position 65. A portion of the fishing line 50 attached to the fish hook 55 is folded over to form a loop 51 and the loop 51 is threaded through the arcuate channel 21 in the proximal tip 20 of the rod 15. The fishing line 50 now acts as a guide, and the apparatus 10 can be slid along the fishing line 50 until the proximal tip 20 of the rod 15 engages the shank 56 of the fish hook 55. The second end 47 of the trigger handle 45 is depressed or otherwise actuated to disengage the trigger pin 41 from the rod 15 and thereby release the rod 15 to forcibly move into the extended position 60 (see FIG. 5). The forcible extension of the rod 15 and the impact of the proximal tip 20 with the embedded fish hook 55 is sufficient to detach the fish hook 55 from the mouth of the fish to allow for its removal. The magnetic proximal tip 20 is operable to hold a metal fish hook within the arcuate channel 21 until removed therefrom.

While the invention has been shown and described in some detail with reference to specific exemplary embodiments, there is no intention that the invention be limited to such detail. On the contrary, the invention is intended to include any alternative or equivalent embodiments that fall within the spirit and scope of the invention as described and claimed herein.

The invention claimed is:
1. An apparatus for removing a fish hook from the mouth of a fish, comprising:
   a) a hollow tubular housing having an open first end and an opposing closed second end;
   b) a rod slidably mounted within said housing for linear movement between an extended position and a retracted position, wherein said rod comprises a proximal end outside of said housing, an opposing distal end secured within said housing, and a middle section slidable between said extended position wherein said middle section is outside of said housing and said retracted position wherein said middle section is within said housing, wherein said rod further comprises a tubular arcuate channel extending from a proximal tip of said proximal end to a side surface of said proximal end to receive a fishing line therethrough and a fish hook shank therein, wherein said rod further comprises an annular slot formed in said middle section;

c) a first rod guide immovably mounted within said housing at said open first end thereof, said first rod guide having a channel therethrough for receiving said rod slidably therein;

d) a second rod guide immovably mounted within said housing between said first rod guide and said closed second end of said housing, said second rod guide having a channel therethrough for receiving said rod slidably therein;

e) a compression spring mounted within said housing between said first rod guide and said second rod guide, wherein said compression spring circumscribes said rod and comprises a first end secured to said rod for concomitant movement therewith and a second end immovably secured to said housing, wherein said rod is biased toward said extended position by said compression spring;

f) a trigger pin slidably mounted through a slot formed through a sidewall of said housing, said trigger pin having a first end within said housing and an opposing second end outside of said housing;

g) a trigger handle pivotably mounted outside of said housing, said trigger handle having a first end connected to said second end of said trigger pin and an opposing second end; and h) a torsion spring mounted against said trigger handle to bias said first end of said trigger handle toward said housing such that said first end of said trigger pin is urged into slidable engagement with said middle section of said rod;

i) wherein said rod is operable to compress said compression spring when said rod is pushed into said housing and into said retracted position;

j) wherein said annular slot is operable to slide into alignment with said first end of said trigger pin when said rod is pushed into said housing and into said retracted position, wherein said first end of said trigger pin is operable to slide into said annular slot when said annular slot slides into alignment with said first end of said trigger pin and thereby reversibly secure said rod within said housing; wherein said tubular arcuate channel receives a portion of the fishing line therein and a loop of folded over fishing line therethrough such that said apparatus is operable to slide along the fishing line until said proximal end of said rod engages the fish hook shank;

k) wherein said trigger handle is operable to pivot said first end of said trigger handle away from said housing when said second end of said trigger handle is depressed toward said housing, wherein said first end of said trigger handle is operable to lift said trigger pin away from said rod and thereby disengage said first end of said trigger pin from said annular slot when said first end of said trigger handle is pivoted away from said housing, wherein said compression spring is operable to forcibly extend said proximal end of said rod away from said housing and into said extended position when said first end of said trigger pin is disengaged from said annular slot;

l) wherein said proximal tip of said rod is operable to forcibly engage a fish hook embedded within the mouth of a fish when said proximal end of said rod forcibly extends away from said housing and thereby remove the fish hook from the mouth of the fish.

2. An apparatus according to claim 1, wherein said proximal tip of said rod is magnetic.

3. An apparatus according to claim 1, wherein said distal end of said rod has a stop member to keep said distal end within said housing.

4. An apparatus for removing a fish hook from the mouth of a fish, comprising:

a) a hollow tubular housing having an open first end and an opposing second end;

b) a rod slidably mounted within said housing for linear movement between an extended position and a retracted position, wherein said rod comprises a proximal end outside of said housing, an opposing distal end secured within said housing, and a middle section slidable between said extended position wherein said middle section is outside of said housing and said retracted position wherein said middle section is within said housing, wherein said rod further comprises a tubular arcuate channel extending from a proximal tip of said proximal end to a side surface of said proximal end to receive a fishing line therethrough and a fish hook shank therein, wherein said rod further comprises a slot formed in said middle section;

c) a first rod guide immovably mounted within said housing at said first end thereof, said first rod guide having a channel therethrough for receiving said rod slidably therein;

d) a second rod guide immovably mounted within said housing between said first rod guide and said second end of said housing, said second rod guide having a channel therethrough for receiving said rod slidably therein;

e) a first spring mounted within said housing between said first rod guide and said second rod guide, wherein said first spring circumscribes said rod and comprises a first end secured to said rod for concomitant movement therewith and a second end immovably secured to said housing, wherein said rod is biased toward said extended position by said first spring;

f) a trigger pin slidably mounted through a slot formed through a sidewall of said housing, said trigger pin having a first end within said housing and an opposing second end outside of said housing;

g) a trigger handle pivotably mounted outside of said housing, said trigger handle having a first end connected to said second end of said trigger pin and an opposing second end; and h) a second spring mounted against said trigger handle to bias said first end of said trigger handle toward said housing such that said first end of said trigger pin is urged into slidable engagement with said middle section of said rod;

i) wherein said rod is operable to compress said first spring when said rod is pushed into said housing and into said retracted position;

j) wherein said slot in said middle section is operable to slide into alignment with said first end of said trigger pin when said rod is pushed into said housing and into said retracted position, wherein said first end of said trigger pin is operable to slide into said slot in said middle section when said slot in said middle section slides into alignment with said first end of said trigger pin and thereby reversibly secure said rod within said housing;

k) wherein said tubular arcuate channel receives a portion of the fishing line therein and a loop of folded over fishing line therethrough such that said apparatus is operable to slide along the fishing line until said proximal end of said rod engages the fish hook shank;

l) wherein said trigger handle is operable to pivot said first end of said trigger handle away from said housing when said second end of said trigger handle is depressed toward said housing, wherein said first end of said trigger handle is operable to lift said trigger pin away from said rod and thereby disengage said first end of said trigger pin from said slot when said first end of said trigger handle is pivoted away from said housing, wherein said first spring is operable to forcibly extend said proximal end of said rod away from said housing and into said extended position when said first end of said trigger pin is disengaged from said slot;

m) wherein said proximal tip of said rod is operable to forcibly engage a fish hook embedded within the mouth of a fish when said proximal end of said rod forcibly extends away from said housing and thereby remove the fish hook from the mouth of the fish.

5. An apparatus according to claim 4, wherein said proximal tip of said rod is magnetic.

6. An apparatus according to claim 4, wherein said distal end of said rod has a stop member to keep said distal end within said housing.

7. An apparatus according to claim 4, wherein said first spring is a compression spring.

8. An apparatus according to claim 4, wherein said second spring is a torsion spring.

* * * * *